United States Patent Office 2,816,912
Patented Dec. 17, 1957

2,816,912

PREPARATION OF PENTAERYTHRITOL CHLOROACYLATES

Helmut M. Engelmann, Wilmington, Del., assignor to Hercules Powder Company, Wilmington, Del., a corporation of Delaware No Drawing. Application March 19, 1954,
Serial No. 417,497

15 Claims. (Cl. 260—488)

This invention relates to a new process of preparing pentaerythritol chloroacylates.

Pentaerythritol chloroacylates, which may also be called pentaerythritol chlorohydrin acylates, are desirable intermediates used for the synthesis of many compounds. Of particular importance are the pentaerythritol trichloromonoacylates or 3-chloro-2,2-bis(chloromethyl)-propyl acylates which are used in the preparation of 3,3-bis(chloromethyl)oxetane which, in turn, may be polymerized to a high molecular weight polymer useful for the production of films, filaments, and various plastic applications. However, pentaerythritol mono-, di-, and tri-haloacylates have previously been prepared only with difficulty, their preparation involving the use of a solvent and the use of high pressures. Under such conditions it is difficult to control the reaction and they are obtained in admixture with pentaerythritol tetrahalides. The latter product is highly undesirable, for the chloro groups once introduced are not readily replaced by acylate groups and hence for the production of a mono-, di-, or tri-haloacylate, the tetrahalide is an unusable by-product.

It was, therefore, most surprising to discover that pentaerythritol monochlorotriacylates, pentaerythritol dichlorodiacylates, or pentaerythritol trichloroacylates could be prepared by contacting a molten pentaerythritol tetraacylate with hydrogen chloride in the presence of an acid condensation catalyst and obtain the desired pentaerythritol chloroacylate as the major product. Not only is the use of a solvent avoided but the process is unique in that it may be carried to any desired degree to produce the monochloride or the dichloride as the major product and when allowed to go to completion, the end product is the desired pentaerythritol trichloroacylate with no, or essentially no, pentaerythritol tetrachloride being formed. In addition, the high pressures previously required for producing these products are not necessary. Another and very important advantage of the process of this invention is that it may be operated as a continuous process if desired.

The following examples will illustrate the process of preparing pentaerythritol chloroacylates in accordance with this invention. All parts and percentages are by weight unless otherwise indicated.

Example 1

A brisk stream of hydrogen chloride was passed through a molten mixture of 537 parts of pentaerythritol tetraacetate and 7.0 parts of zinc acetate dihydrate held at a temperature of 195°–200° C. The acetic acid was removed through an entrainment separator as soon as it was evolved, along with the unreacted hydrogen chloride. The hydrogen chloride treatment was continued until the acetic acid evolution essentially had ceased, which took about 14 hours. A total of 330 parts of crude acetic acid was collected. This was then distilled whereby there was obtained about 320 parts of pure acetic acid. The residue which remained was combined with the reaction product in the pot and the combined product was then distilled under reduced pressure. The fraction boiling at 156°–161° C. under 20 mm. pressure amounted to 390 parts and had a refractive index at 20° C. of 1.4815. This amounted to a 95% yield of pentaerythritol trichloroacetate.

Example 2

Hydrogen chloride gas was passed into molten pentaerythritol tetraacetate containing a catalytic amount of anhydrous aluminum chloride at a temperature of about 175° C. The acetic acid was removed by distillation as it formed along with the unreacted hydrogen chloride. After about 3 hours, 25 parts of acetic acid had been removed. The residue was then distilled under reduced pressure whereby a fraction amounting to 64 parts was obtained at 160°–170° C. at 15 mm. pressure. On analysis it was found to contain 24.2% chlorine (theory for pentaerythritol dichlorodiacetate is 27.6%).

Example 3

Hydrogen chloride gas was passed into a molten mixture of 130 parts of pentaerythritol tetraacetate and 2 parts of zinc acetate, the temperature being held at 160°–190° C., until 25.6 parts of acetic acid had been removed by distillation. This was the theoretical amount to be removed for the preparation of the monochloro compound. On distillation of the residue there was obtained 98 parts of a fraction which on analysis was found to contain 15.7% chlorine (theory for pentaerythritol monochlorotriacetate is 12.5% chlorine).

Example 4

Gaseous hydrogen chloride was passed into a mixture of 132 parts of pentaerythritol tetracaproate and 2 parts of zinc acetate hydrate at a temperature of about 220° C. The caproic acid which evolved was removed by distillation until 28 parts of it had been removed. On distillation of the residue there was obtained 22 parts of a fraction boiling at 130°–173° C. at 1 mm. and 55 parts of a fraction boiling at 173°–230° C. at 1 mm. These fractions were combined, slurried with calcium hydroxide, filtered, and redistilled. The product so obtained had a refractive index at 20° C. of 1.4620 and contained 18.9% chlorine (theory for pentaerythritol dichlorodicaproate is 19.2%).

Example 5

In this example the preparation of pentaerythritol trichloromonoacetate was carried out as a continuous operation in a tower operated under flooded conditions. The tower was packed with Berl saddles and into the top was fed continuously a stream comprising molten pentaerythritol tetraacetate and 1% of zinc chloride based on the pentaerythritol tetraacetate at the rate of 3630 parts per hour, the tower being jacketed and maintained at 220° C. during the reaction. Anrydrous hydrogen chloride was passed up through the tower, countercurrent to the pentaerythritol tetraacetate stream, at the rae of 1600 parts per hour. The acetic acid formed as a reaction product plus the excess hydrogen chloride was carried over into a condenser and removed at a rate of 2660 parts per hour. The pressure on the system was maintained at 40 p. s. i. gage by the excess hydrogen chloride. The liquid level was held at the top of the packing by regulating the continuous withdrawal of reacted material from the bottom of the tower, the product being collected at the rate of 2560 parts per hour. Under these conditions the contact time of the pentaerythritol tetraacetate with the hydrogen chloride was about ½ hour. The product so withdrawn was fractionated to obtain the pentaerythritol trichloromonoacetate and had a boiling point of 141°–142° C. at 15 mm. and a refractive index at 20° C. of 1.4836. This amounts to a conversion of about 76% based on the amount of pentaerythritol tetraacetate passing through the tower. The acetic acid-hydrogen chloride distillate was distilled in order to obtain an additional amount of the pentaerythritol trichloroacetate which had been carried over into the acetic acid distillate by entrainment.

*Example 6*

A stream of molten pentaerythritol tetraacetate (obtained by acetylation of a commercial pentaerythritol) admixed with 1% of zinc chloride was fed, at the rate of 700 parts per hour, into a tower packed with Berl saddles. Anhydrous hydrogen chloride was fed to the bottom of the tower at the rate of 540 parts per hour. The tower was operated under film conditions at 40 p. s. i. gage and 220° C. The crude product was removed from the bottom at the rate of 490 parts per hour and the crude acetic acid was removed at the rate of 510 parts per hour. Excess hydrogen chloride was bled from the system at 170 parts per hour. The reaction time under these conditions was approximately 15 to 20 minutes. The crude products so obtained had a specific gravity of 1.321 at 29° C., indicating a high conversion to pentaerythritol trichloroacetate.

*Example 7*

Hydrogen chloride gas was passed into 300 parts of a molten pentaerythritol tetraacetate containing 0.5% of sulfuric acid at a temperature of about 200° C. The acetic acid was removed as it formed by distillation along with the unreacted hydrogen chloride. At the end of 7.5 hours, 126 parts of acetic acid had been removed, which amount was about the theoretical amount for the formation of pentaerthritol dichlorodiacetate.

The process of this invention makes it possible to replace one, two, or three of the acylate groups in a pentaerythritol tetraacylate as desired. Of particular importance is the fact that this invention enables the production of pentaerythritol trichloromonoacylates in an unusually pure form and in addition by a process that is economically feasible for commercial production. As may be seen from the foregoing examples, the process of this invention may be operated as a batch process or as a continuous operation. An important advantage in the present process is the fact that the reaction does not need to be carried out under high pressure and consequently the use of high pressure apparatus is avoided. When the reaction is carried out as a batch process, atmospheric pressure is generally used. However, when it is operated as a continuous process, it is usually desirable to operate under a slight pressure of hydrogen chloride. Nevertheless, such a pressure does not place the process in the category of necessitating elaborate high pressure apparatus and techniques. In general, the process in accordance with this invention is carried out at pressures varying from atmospheric pressure to a pressure of about 500 p. s. i. Higher pressures may be used if desired but are believed to serve little or no useful purpose.

Any pentaerythritol tetraacylate may be converted to the corresponding pentaerythritol mono-, di-, or tri-chloroacylate by the process of this invention, as, for example, the pentaerythritol esters of aliphatic and aromatic carboxylic acids, etc. The invention is particularly useful for the preparation of pentaerythritol mono-, di-, and tri-chloroalkanates such as pentaerythritol mono-, di-, and tri-chloroacetates, pentaerythritol mono-, di-, and tri-chloropropionates, pentaerythritol mono-, di-, and tri-chlorobutyrates, pentaerythritol mono-, di-, and tri-chlorocaproates, etc. Instead of using a pure pentaerythritol tetraacylate, i. e., the product obtained on completely esterifying a pure pentaerythritol, there may be used the product obtained on esterification of a commercial pentaerythritol and which may or may not contain small amounts of incompletely esterified pentaerythritol.

The hydrogen chloride is, in accordance with this invention, passed into the molten pentaerythritol tetraacylate in the presence of an acidic catalyst. Catalysts which are effective are those materials which act like acids, as, for example, those catalysts generally classified as the acidic condensation catalysts such as strong acids, Friedel-Crafts type catalysts, various phosphorus chlorides, etc. Exemplary of the acidic catalysts which may be used are such acids as sulfuric acid, perchloric acid, phosphoric acid, sulfonic acids such as benzene-sulfonic acid, p-toluenesulfonic acid, and other organic acids such as trichloroacetic acid and other haloacetic acids, picric acid, nitroacetic acid, etc.; phosphorus trichloride, phosphorus pentachloride, phosphorus oxychloride, etc. A preferred group of the acidic catalysts are the Friedel-Crafts type catalysts such as anhydrous aluminum chloride and other aluminum salts, anhydrous ferric chloride, boron trifluoride and its molecular complexes with ethers and acids, stannic chloride, mercuric chloride, zinc chloride and other zinc salts, etc. Of particular usefulness are the zinc salts including both salts of inorganic acids, as, for example, zinc chloride, zinc sulfate, zinc nitrate, zinc carbonate, zinc sulfide and zinc oxide, and salts of organic acids, as, for example, zinc formate, zinc acetate, zinc propionate, etc. These acidic catalysts act as true catalysts for the process; hence, any amount of the catalytic agent may be used from a catalytic amount up to about 15%. In general, an amount of from about 0.1% to about 5% of the catalyst is used based on the pentaerythritol tetraacylate. Obviously for the most efficient reaction, the catalyst that is used should be one that does not distill from the reaction mixture at the temperature at which the reaction is carried out.

The temperature at which the reaction is carried out will depend upon whether the reaction is being carried out as a batch or continuous operation, what pentaerythritol tetraacylate is being reacted, etc. In general, the temperature should be within the range of from about 130° C. to about 260° C., and more preferably from about 160° C. to about 240° C.

The acid formed as a by-product during the reaction of the pentaerythritol tetraacylate and hydrogen chloride is preferably removed as it is formed. In either the batch or continuous process, this is done by allowing the acid, as, for example, acetic acid formed when pentaerythritol tetraacetate is reacted, to distill from the reactor or tower. This allows a higher operating temperature and increases the reaction rate. Furthermore, by removing the acid formed during the reaction, it is possible to determine the extent of the reaction by measuring the amount of acid formed and then stop the reaction at the point where the pentaerythritol monochlorotriacylate, or the pentaerythritol dichlorodiacylate, is the major product if these products are desired. For the preparation of the pentaerythritol trichloromonoacylates the reaction is allowed to continue until essentially no more acid by-product is formed.

The process of this invention is readily operated as a continuous process as may be seen from the foregoing examples. For the more efficient reaction the hydrogen chloride and molten pentaerythritol tetraacylate are passed countercurrently through a tube or tower. The contact time between the two reactants may then be regulated by the rate at which the pentaerythritol tetraacylate is fed to the reactor and the size of the column, etc. Many other modifications used in continuous operations may be adapted to this process.

As already pointed out, when carried out in accordance with this invention, the reaction yields the pentaerythritol chloroacylates and especially the pentaerythritol trichloromonoacylates in relatively pure form. They may be further purified by distillation under reduced pressure.

What I claim and desire to protect by Letters Patent is:

1. The process of replacing from 1 to 3 of the carboxyl groups in a pentaerythritol tetra-ester of a lower alkyl monocarboxylic acid with chloro groups which comprises contacting a molten pentaerythritol tetra-ester of a lower alkyl monocarboxylic acid with hydrogen chloride in the presence of an acidic catalyst at a temperature of from about 130° C. to about 260° C., the catalyst being present in an amount up to about 15% based on the weight of the pentaerythritol tetra-ester.

2. The process of replacing from 1 to 3 of the carboxyl groups in a pentaerythritol tetra-ester of a lower alkyl monocarboxylic acid with chloro groups which comprises contacting a molten pentaerythritol tetra-ester of a lower alkyl monocarboxylic acid with hydrogen chloride in the presence of a metal salt catalyst of the Friedel-Crafts type at a temperature of from about 130° C. to about 260° C., the catalyst being present in an amount up to about 15% based on the weight of the pentaerythritol tetra-ester.

3. The process of replacing from 1 to 3 of the carboxyl groups in a pentaerythritol tetra-ester of a lower alkyl monocarboxylic acid with chloro groups which comprises contacting a molten pentaerythritol tetra-ester of a lower alkyl monocarboxylic acid with hydrogen chloride in the presence of a zinc salt as catalyst at a temperature of from about 130° C. to about 260° C., the catalyst being present in an amount up to about 15% based on the weight of the pentaerythritol tetra-ester.

4. The process of replacing from 1 to 3 of the carboxyl groups in a pentaerythritol tetra-ester of a lower alkyl monocarboxylic acid with chloro groups which comprises contacting a molten pentaerythritol tetra-ester of a lower alkyl monocarboxylic acid with hydrogen chloride in the presence of an acidic catalyst at a temperature of from about 160° C. to about 240° C., the catalyst being present in an amount of from about 0.1% to about 5% based on the weight of the pentaerythritol tetra-ester.

5. The process of replacing from 1 to 3 of the carboxyl groups in a pentaerythritol tetra-ester of a lower alkyl monocarboxylic acid with chloro groups which comprises contacting a molten pentaerythritol tetra-ester of a lower alkyl monocarboxylic acid with hydrogen chloride in the presence of a metal salt catalyst of the Friedel-Crafts type at a temperature of from about 160° C. to about 240° C., the catalyst being present in an amount of from about 0.1% to about 5% based on the weight of the pentaerythritol tetra-ester.

6. The process of replacing from 1 to 3 of the carboxyl groups in a pentaerythritol tetra-ester of a lower alkyl monocarboxylic acid with hydrogen chloride in the presence of a zinc salt as catalyst at a temperature of from about 160° C. to about 240° C., the catalyst being present in an amount of from about 0.1% to about 5% based on the weight of the pentaerythritol tetra-ester.

7. The process of preparing a pentaerythritol trichlorohydrinmonoacylate which comprises contacting a molten pentaerythritol tetra-ester of a lower alkyl monocarboxylic acid admixed with at least a catalytic amount of a zinc salt at a temperature of from about 130° C. to about 260° C. with hydrogen chloride, the catalyst being present in an amount up to about 15% based on the weight of the pentaerythritol tetra-ester.

8. The process of preparing pentaerythritol trichlorohydrinacetate which comprises contacting molten pentaerythritol tetraacetate admixed with at least a catalytic amount of a zinc salt at a temperature of from about 130° C. to about 260° C. with hydrogen chloride, the catalyst being present in an amount up to about 15% based on the weight of the pentaerythritol tetra-ester.

9. The process of preparing pentaerythritol trichlorohydrinacetate which comprises contacting molten pentaerythritol tetraacetate admixed with at least a catalytic amount of zinc chloride at a temperature of from about 190° C. to about 240° C. with hydrogen chloride, the catalyst being present in an amount of from about 0.1% to about 5% based on the weight of the pentaerythritol tetra-ester.

10. The process of preparing pentaerythritol trichlorohydrinacetate which comprises contacting molten pentaerythritol tetraacetate admixed with at least a catalytic amount of zinc acetate at a temperature of from about 190° C. to about 240° C. with hydrogen chloride, the catalyst being present in an amount of from about 0.1% to about 5% based on the weight of the pentaerythritol tetra-ester.

11. A continuous process of preparing pentaerythritol trichlorohydrinmonoacetate which comprises passing hydrogen chloride into a stream of molten pentaerythritol tetraacetate admixed with at least a catalytic amount of a zinc salt while continuously removing the acetic acid by-product at a point removed from the hydrogen chloride inlet point and withdrawing the pentaerythritol trichlorohydrinmonoacetate, the temperature during the reaction being maintained between about 190° C. and about 240° C., the catalyst being present in an amount of from about 0.1% to about 5% based on the weight of the pentaerythritol tetra-ester.

12. A continuous process of preparing pentaerythritol trichlorohydrinmonoacetate which comprises passing hydrogen chloride through a tower countercurrent to a stream of molten pentaerythritol tetraacetate admixed with at least a catalytic amount of a zinc salt while continuously removing the acetic acid by-product at a point removed from the hydrogen chloride inlet point and withdrawing the pentaerythritol trichlorohydrinmonoacetate from the bottom of the tower, the temperature during the reaction being maintained between about 190° C. and about 240° C., the catalyst being present in an amount of from about 0.1% to about 5% based on the weight of the pentaerythritol tetra-ester.

13. A continuous process of preparing a pentaerythritol trichlorohydrinmonoacylate which comprises passing hydrogen chloride into a stream of a molten pentaerythritol tetra-ester of a lower alkyl monocarboxylic acid admixed with a metal salt catalyst of the Friedel-Crafts type while continuously removing the by-product acid at a point removed from the hydrogen chloride inlet point and withdrawing the pentaerythritol trichlorohydrinmonoacylate, the temperature during the reaction being maintained between about 130° C. and about 260° C., the catalyst being present in an amount up to about 15% based on the weight of the pentaerythritol tetra-ester.

14. A continuous process of preparing a pentaerythritol trichlorohydrinmonoacylate which comprises passing hydrogen chloride through a tower countercurrent to a stream of molten pentaerythritol tetra-ester of a lower alkyl monocarboxylic acid admixed with a metal salt catalyst of the Friedel-Crafts type while continuously removing the by-product acid at a point removed from the hydrogen chloride inlet point and continuously withdrawing the pentaerythritol trichlorohydrinmonoacylate from the bottom of the tower, the temperature during the reaction being maintained between about 130° C. and about 260° C., the catalyst being present in an amount up to about 15% based on the weight of the pentaerythritol tetra-ester.

15. The process of replacing from 1 to 3 of the carboxyl groups in a pentaerythritol tetra-ester of an acid of the group consisting of aliphatic and aromatic carboxylic acids with chloro groups which comprises contacting said pentaerythritol tetra-ester while molten with hydrogen chloride in the presence of an acidic catalyst at a temperature of from about 130° C. to about 260° C., the catalyst being present in an amount up to about 15% based on the weight of the pentaerythritol tetra-ester.

References Cited in the file of this patent

UNITED STATES PATENTS 2,763,679   Dee ------------------ Sept. 18, 1956

OTHER REFERENCES

Fecht, Ber. Deut. Chem. 40 (1907), 3888–9.
Dobryanskii et al., Chem. Abst. 42 (1948), 1562.